United States Patent [19]

Fisher et al.

[11] 3,728,374

[45] Apr. 17, 1973

[54] CYANOVINYLENE-TRIARYLAMINES

[75] Inventors: John G. Fisher; Curtis E. Diebert, both of Kingsport, Tenn.

[73] Assignee: Eastman Kodak Company, Rochester, N.Y.

[22] Filed: Jan. 4, 1972

[21] Appl. No.: 215,439

[52] U.S. Cl. ...................... 260/465 D, 8/542, 8/179, 260/465 E, 260/576
[51] Int. Cl. .............................................. C07c 121/70
[58] Field of Search ...................... 260/465 E, 465 D

[56] References Cited

UNITED STATES PATENTS 2,206,108   7/1940   Muller et al. ........................ 260/465

*Primary Examiner*—Lewis Gotts
*Assistant Examiner*—Dolph H. Torrence
*Attorney*—Cecil D. Quillen, Jr. et al.

[57] ABSTRACT

Cyanovinylene-substituted triarylamine compounds produce fluorescent, light-fast greenish-yellow to yellow shades on polyester and cellulose acetate fibers.

7 Claims, No Drawings

CYANOVINYLENE-TRIARYLAMINES

This invention concerns novel styryl compounds and, more particularly, it concerns styryl compounds which contain a triarylamine residue, are highly fluorescent and which are useful for dyeing polyester and cellulose acetate fibers.

Our novel compounds have the general formula

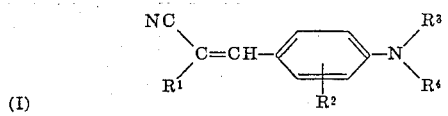

(I)

wherein $R^1$ is cyano; lower alkoxycarbonyl; lower alkoxycarbonyl substituted with lower alkoxy, hydroxy, cyano, halogen, succinimido, glutarimido or phthalimido; aryloxycarbonyl; lower alkylsulfonyl; arylsulfonyl; or the group -CONR$^5$R$^6$ in which $R^5$ is hydrogen, lower alkyl, aryl, or, when $R^6$ is hydrogen, $R^5$ also can be lower alkanoyl or lower alkoxycarbonyl, and $R^6$ is hydrogen or lower alkyl;

$R^2$ is hydrogen, lower alkyl or lower alkoxy; and $R^3$ and $R^4$ are the same or different and each is aryl; in which each aryl group is phenyl or phenyl substituted with lower alkyl, lower alkoxy or halogen.

The novel compounds of the invention produce greenishyellow to yellow shades on polyester fibers when applied thereto according to conventional disperse dyeing techniques. Due to their fluorescence, our novel compounds produce unusually bright shades, especially when viewed under natural light. The styryl compounds also exhibit good fastness to light and dyeability properties.

The substituents encompassed by the generic terminology appearing in the above definitions of $R^1$ through $R^6$ are well known in the art and can be derived from known compounds according to published procedures. As used herein to describe an alkyl moiety, "lower" designates a carbon content of 1 to about 4 carbon atoms. Chlorine and bromine are preferred halogen atoms which can be present on our novel compounds.

The compounds of the invention which, because of their excellent cost:performance ratio, are especially valuable for dyeing polyester fibers are those in which $R^1$ is cyano or lower alkoxycarbonyl, $R^2$ is hydrogen or methyl and $R^3$ and $R^4$ each is phenyl or tolyl.

The novel compounds of the invention are prepared by the condensation of a triarylamine aldehyde and an active methylene compound. This condensation is generally conducted under basic conditions in an organic solvent at a temperature of 60° to 100°C. For example, the reaction can be conveniently conducted in benzene at reflux with piperidine as the basic catalyst. The styryl compounds can be isolated by cooling the reaction mixture, whereupon the product crystallizes from solution.

The triarylamine aldehyde intermediates are prepared by formylation of the corresponding triarylamines with a Vilsmeier-type formylating agent. The formylation generally proceeds smoothly and in high yield. Depending upon the position, of the substituent, if any, represented by $R^2$ and any substituents present on the phenyl nuclei of aryl groups $R^3$ and $R^4$, the formylation of the triarylamine precursors can result in the formation of multiple formylation products which, when condensed with the active methylene compound, yield a mixture of methine compounds. Such a mixture of methine compounds, consisting of at least two compounds conforming to Formula (I), can be used to produce bright shades on polyester fibers as described hereinabove. The triarylamines can be prepared by the well-known Ullman reaction. For example, triphenylamine is prepared by the treatment of diphenylamine with iodobenzene in the presence of copper or copper-bronze and potassium carbonate. The active methylene compounds having the formula $R^1$—CH$_2$—CN are known compounds and/or can be prepared by known means.

The following examples further illustrate the preparation and use of our novel compounds.

EXAMPLE 1

*p*-Diphenylaminobenzaldehyde (1.37 g., 0.005 mole), malononitrile (0.36 g., 0.0055 mole), ethanol (20 ml.), and piperidine (1 drop) are combined and heated at reflux for 1 hr. The mixture is then chilled in an ice bath and filtered. An orange, crystalline solid (1.30 g.) is obtained. The product, *p*-diphenylaminobenzylidenemalononitrile, is recrystallized from ethyl acetate; m.p. 137°–138.5°C.; visible λ max = 431 nm. (acetone). *Anal.* Calcd. for C$_{22}$H$_{15}$N$_3$: C, 82.22; H, 4.71; N, 13.07 Found: C, 82.17; H, 4.76; N, 13.18 The brilliant, fluorescent, yellow product obtained displays excellent dyeing and fastness properties on cellulose ester and polyester fibers.

EXAMPLE 2

*p*-Diphenylaminobenzaldehyde (54.7 g., 0.2 mole), ethyl cyanoacetate (24.9 g., 0.22 mole), absolute ethanol (350 ml.), and piperidine (1 ml.) are combined and heated at reflux for 3 hr. The mixture is chilled, filtered, and the solid yellow product, ethyl *p*-diphenylamine-α-cyanocinnamate (67.4 g.), is recrystallized from ethanol-ethyl acetate; m.p. 118°–121°C.; visible λ max = 420 nm. (acetone). *Anal.* Calcd. for C$_{24}$H$_{20}$N$_2$O$_2$: C, 78.24; H, 5.47; N, 7.61

Found: C, 78.36; H, 5.56; N, 7.59 The brilliant greenish-yellow, fluorescent compound obtained displays excellent dyeing and fastness properties on cellulose ester and polyester fibers.

EXAMPLE 3

The procedure of Example 1 is repeated except that malononitrile and *p*-diphenylamino-*o*-methoxybenzaldehyde are employed as starting materials. The yellow solid obtained is recrystallized from ethyl acetate; m.p. 179°–181°C., visible λ max = 427 nm. (acetone). The brilliant yellow, fluorescent compound, *p*-(n-phenyl-*o*-anisidino)benzylidenemalononitrile, obtained displays excellent dyeing and light-fastness properties on cellulose ester and polyester fibers.

The styryl compounds set forth in the examples of the following Table conform to Formula (I) and are prepared by the procedures described hereinabove. The color given for each of the compounds of the following examples refers to the shade it produces on polyester fibers. The position of substituent $R^2$ relates to the triarylamine nitrogen atom.

| Example number | R¹ | R² | R³ | R⁴ | Color |
|---|---|---|---|---|---|
| 4 | C₆H₅SO₂— | H | —C₆H₅ | —C₆H₅ | Yellow. |
| 5 | —CN | H | —C₆H₄—o—OCH₃ | —C₆H₅ | Do. |
| 6 | —COOC₂H₅ | H | —C₆H₄—o—OCH₃ | —C₆H₅ | Greenish-yellow. |
| 7 | —COO(CH₂)₃CH₃ | H | —C₆H₄—o—OCH₃ | —C₆H₅ | Do. |
| 8 | C₆H₅SO₂— | H | —C₆H₄—o—OCH₃ | —C₆H₅ | Do. |
| 9 | —CO₂CH₂CH₂CH₃ | H | —C₆H₅ | —C₆H₅ | Do. |
| 10 | p-CH₃O—C₆H₄COO | H | —C₆H₅ | —C₆H₅ | Do. |
| 11 | C₂H₅OOCNHCO— | H | —C₆H₅ | —C₆H₅ | Do. |
| 12 | —COO(CH₂)₃CH₃ | H | —C₆H₅ | —C₆H₅ | Do. |
| 13 | —COOCH₂CH₂CN | H | —C₆H₅ | —C₆H₅ | Yellow. |
| 14 | p-CH₃OC₆H₄COO— | H | —C₆H₅ | —C₆H₅ | Do. |
| 15 | —CONH₂ | 3-CH₃ | —C₆H₄—p—CH₃ | —C₆H₄—p—CH₃ | Do. |
| 16 | —COOCH₂CH₂NCO—o—C₆H₄CO | 3-CH₃ | —C₆H₄—p—CH₃ | —C₆H₄—p—CH₃ | Do. |
| 17 | —CON(CH₃)₂ | H | —C₆H₅ | —C₆H₅ | Do. |
| 18 | —COOCH₂CH₂OCH₃ | H | —C₆H₅ | —C₆H₅ | Do. |
| 19 | —CONHC₆H₅ | H | —C₆H₅ | —C₆H₅ | Do. |

The polyester and cellulose acetate fibers which can be dyed with our novel compounds and the dyeing techniques are well known in the art. See, for example, French Pat. 2,008,404 and U. S. Pats. No. 3,491,082 and 3,553,245.

The invention has been described in detail with particular reference to certain preferred embodiments thereof, but it will be understood that variations and modifications can be made without departing from the spirit and scope of the invention as described hereinabove.

We claim:

1. A compound having the formula

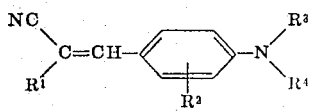

wherein

R¹ is cyano; lower alkoxycarbonyl; lower alkoxycarbonyl substituted with lower alkoxy, hydroxy, cyano, halogen, succinimido, glutarimido or phthalimido; aryloxycarbonyl; lower alkylsulfonyl; arylsulfonyl; or the group -CONR⁵R⁶ in which R⁵ is hydrogen, lower alkyl, aryl or, when R⁶ is hydrogen, R⁵ also can be lower alkanoyl or lower alkoxycarbonyl, and R⁶ is hydrogen or lower alkyl;

R² is hydrogen, lower alkyl or lower alkoxy; and

R³ and R⁴ are the same or different and each is aryl; in which each aryl group is phenyl or phenyl substituted with lower alkyl, lower alkoxy or halogen.

2. A compound according to claim 1 wherein

R¹ is cyano or lower alkoxycarbonyl;

R² is hydrogen or methyl; and

R³ and R⁴ each is phenyl or tolyl.

3. A compound according to claim 1 having the formula

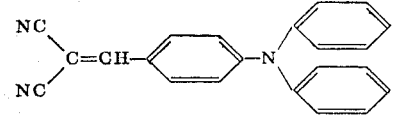

4. A compound according to claim 1 having the formula

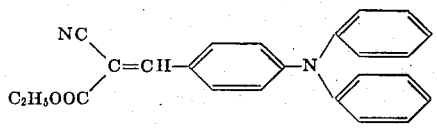

5. A compound according to claim 1 having the formula

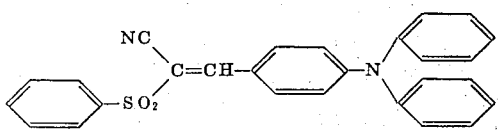

6. A compound according to claim 1 having the formula

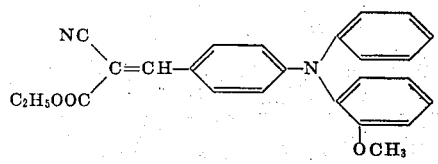

7. A compound according to claim 1 having the formula

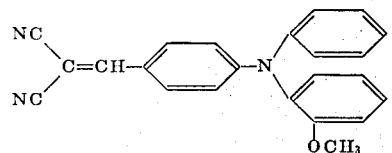

* * * * *